(12) United States Patent
Wallace et al.

(10) Patent No.: US 6,550,252 B2
(45) Date of Patent: Apr. 22, 2003

(54) NITROGEN STRIPPING OF HYDROTREATER CONDENSATE

(75) Inventors: Paul S. Wallace, Katy, TX (US); Kay A. Johnson, Missouri City, TX (US); Alma I. Rodarte, Stafford, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 09/974,331

(22) Filed: Oct. 10, 2001

(65) Prior Publication Data

US 2002/0068768 A1 Jun. 6, 2002

Related U.S. Application Data

(60) Provisional application No. 60/239,728, filed on Oct. 12, 2000.

(51) Int. Cl.[7] ............................... F02C 3/28
(52) U.S. Cl. .......................... 60/780; 60/39.12
(58) Field of Search .................. 60/39.12, 772, 60/780, 781, 783

(56) References Cited

U.S. PATENT DOCUMENTS

| | | | |
|---|---|---|---|
| 3,868,817 A | 3/1975 | Marion et al. ............. 60/39.02 |
| 3,998,609 A | 12/1976 | Crouch et al. ................ 48/197 |
| 4,099,382 A | 7/1978 | Paull et al. .................... 60/648 |
| 4,158,948 A * | 6/1979 | Schlinger ..................... 60/772 |
| 4,178,758 A | 12/1979 | Paull et al. ..................... 60/648 |
| 4,328,006 A | 5/1982 | Muenger et al. ............... 48/62 |
| 4,377,132 A | 3/1983 | Koog et al. ...................... 122/7 |
| 4,462,339 A | 7/1984 | Jahnke et al. ................... 122/7 |
| 4,801,307 A | 1/1989 | Muenger et al. ............... 48/69 |
| 5,472,986 A | 12/1995 | Van Dijk .................... 518/705 |
| 6,225,358 B1 * | 5/2001 | Kennedy .................... 518/700 |

FOREIGN PATENT DOCUMENTS

| | | |
|---|---|---|
| DE | WO 97/10416 | 3/1997 |
| EP | 0 955 455 A1 | 11/1999 |
| WO | WO 00/37356 | 6/2000 |
| WO | WO 00/42123 | 7/2000 |

OTHER PUBLICATIONS

*Kirk–Othmer Encyclopedia of Chemical Technology*, Fourth Edition vol. 7, John Wiley & Sons, pp. 662–664.

* cited by examiner

*Primary Examiner*—Louis J. Casaregola
(74) *Attorney, Agent, or Firm*—Frank C. Turner

(57) ABSTRACT

A hydrotreated liquid contains volatile hydrocarbons, hydrogen, and contaminants such as hydrogen sulfide. An inert gas, preferably nitrogen, is used to strip volatiles from the hydrotreated liquid. This stripper gas is then added to fuel gas fed to a combustion turbine, where combustibles in the fuel gas and stripper gas are combusted. The stripping is at a pressure sufficient to allow the stripper gas, now containing hydrocarbons and hydrogen, to be added to the combustion turbine fuel without additional compression. This process allows for efficient use of the stripped combustibles, and the nitrogen added to the fuel, gas provides increased power generation from the combustion turbine and reduces $NO_x$ emissions.

23 Claims, 2 Drawing Sheets

NITROGEN STRIPPING OF HYDROTREATER CONDENSATE

This application claims benefit of Provisional Application Serial No. 60/239,728 filed Oct. 12, 2000.

BACKGROUND OF THE INVENTION

Production of fuel gas by partial oxidation of a hydrocarbonaceous fuel is known in the art. After further processing, the fuel gas is burned in a combustion turbine, purified, optionally mixed with a diluent, such as steam or nitrogen, and burned in a gas turbine to produce mechanical work and electrical energy.

The prior art, however, does not teach or suggest the instant invention. Gasification is integrated with hydrotreating such that hydrogen gas obtained from synthesis gas gasification process is used to hydrotreat petroleum liquids. The remaining synthesis gas is burned in a combustion turbine to generate power. Nitrogen is used to strip hydrogen and volatile hydrocarbons from the hydrotreated petroleum liquid under conditions such that this stripper gas can be sent to the combustion turbine.

SUMMARY OF THE INVENTION

The present invention provides an integration of hydrotreating and power generation. The invention comprises using an inert gas, preferably nitrogen, to strip volatiles from a hydrotreated oil. This stripper gas is then added to fuel gas and fed to a combustion turbine, where combustibles in the fuel gas and stripper gas are combusted, and where the exhaust gases are expanded through the turbine to generate power.

In one embodiment, the invention includes an integration of the processes of gasification, hydrotreating, and power generation. The gasification process separates air into substantially pure oxygen and nitrogen. The substantially pure oxygen is used to gasify hydrocarbonaceous material, thereby producing synthesis gas. A hydrogen-enriched gas is separated from the synthesis gas. This hydrogen gas is used to hydrotreat a hydrocarbon liquid, producing an upgraded hydrocarbon liquid but also producing as a byproduct methane, ethane, propane, and the like. The concentration of these hydrocarbons builds up in the hydrogen gas, necessitating a purge stream. This purge stream may be added to the remaining synthesis gas, and this gas is advantageously burned in a combustion turbine to generate power. Nitrogen, a byproduct of the manufacture of substantially pure oxygen, is advantageously added to the combustion turbine fuel to increase power and to reduce nitrous oxides ($NO_x$) emissions. The hydrotreated liquid contains volatile hydrocarbons, hydrogen, and contaminants such as hydrogen sulfide. These volatiles are stripped with the nitrogen byproduct of making the substantially pure oxygen. The stripping is at a pressure sufficient to allow the stripper gas, now containing hydrocarbons and hydrogen, to be added to the combustion turbine fuel without additional compression. This is efficient use of the stripped combustibles, and the nitrogen also increases power generation and reduces $NO_x$ emissions.

DETAILED DESCRIPTION OF THE INVENTION

Figure 1:
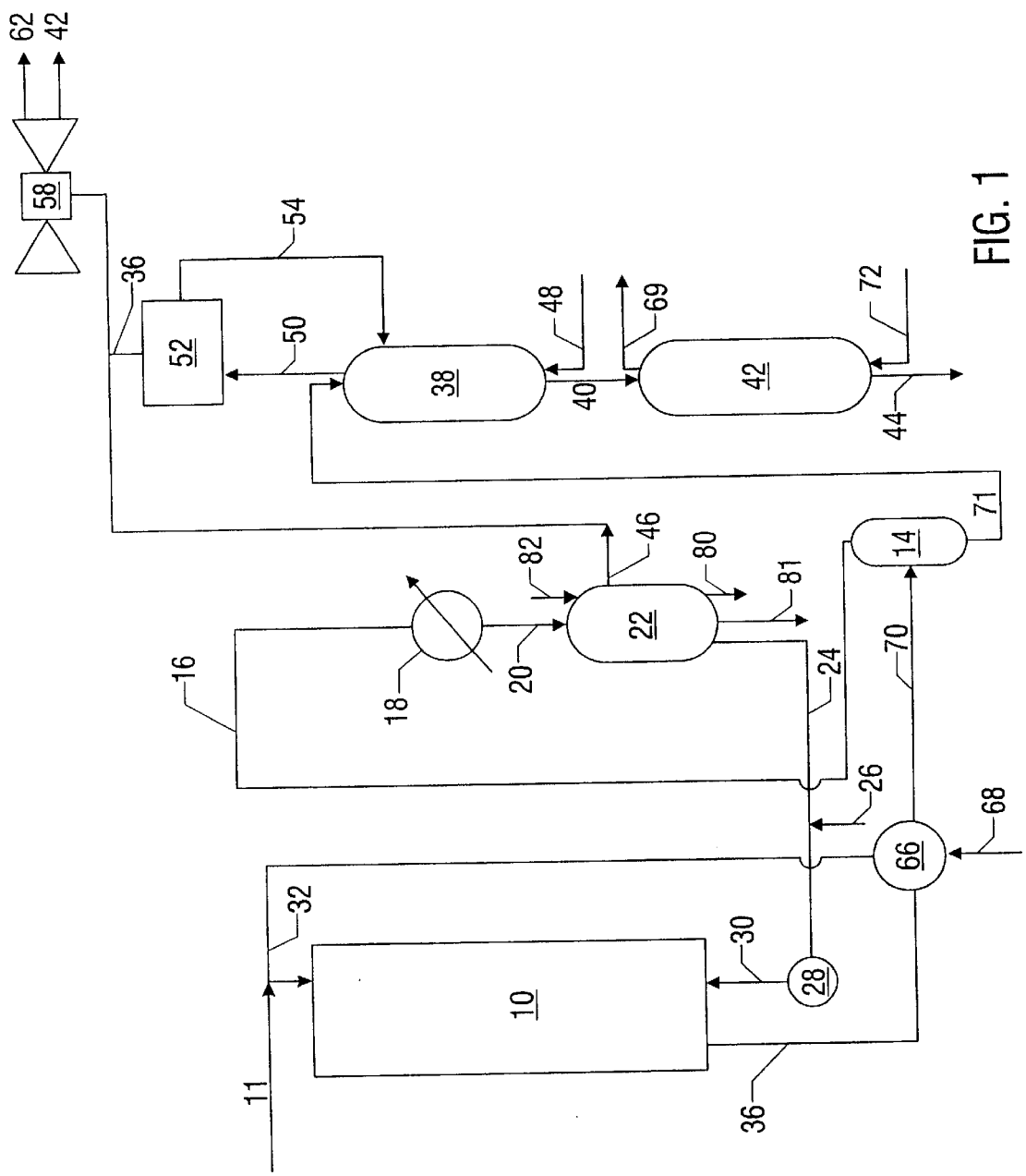
FIG. 1 is a schematic of one embodiment of the invention.

The invention is an integration of hydrotreating and power-generation. In a preferred embodiment, the invention is an integration of gasification, hydrotreating, and power generation. The invention is the stripping of volatiles from hydrotreated liquids with an inert gas, wherein in a preferred embodiment the stripping is at a pressure sufficient to add the hydrocarbon-containing stripper gas to a combustion turbine without additional compression.

As used herein, the terms "synthesis gas" and "fuel gas" refer to gases comprising both hydrogen gas and carbon monoxide gas. The term "hydrogen" refers to gas that is primarily hydrogen, and which usually contains more than about 80 mole percent hydrogen gas. As used herein, the term "volatiles" refers to hydrocarbons containing between one and about 8 carbon atoms. What constitutes a volatile depends on temperature. At temperatures above 150° C., octanes are volatile. At room temperature, butanes are the heaviest hydrocarbons considered to be a "volatile".

As used herein, the term "high pressure" is a pressure of between about 800 psi and 3000 psi, typically between about 1200 psi and about 2000 psi. As used herein, the term "moderate pressure" is a pressure of typically between about 100 psi and 800 psi, more typically between about 200 psi and about 500 psi. As used herein, the term "low pressure" is a pressure below about 100 psi.

Gasification utilizes a predetermined quantity of oxygen to gasify hydrocarbonaceous material, thereby producing synthesis gas. That is, the synthesis gas is prepared by partially oxidizing a hydrocarbonaceous fuel and oxygen in a reactor, often in the presence of steam or water, in proportions producing a mixture containing carbon monoxide and hydrogen in the reactor. Synthesis gas can be manufactured by any partial oxidation method. The gasification processes are known to the art. See, for example, U.S. Pat. Nos. 3,868,817, 4,099,382 and 4,178,758, the disclosures of which are incorporated herein by reference. Gasification is advantageously completed at high pressure.

The term "hydrocarbonaceous" as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". Solid, gaseous, and is liquid feeds may be mixed and used simultaneously; and these may include paraffinic, olefinic, acetylenic, naphthenic, asphaltic, and aromatic compounds in any proportion. Also included within the definition of the term "hydrocarbonaceous" are oxygenated hydrocarbonaceous organic materials including carbohydrates, cellulosic materials, plastics, aldehydes, organic acids, alcohols, ketones, oxygenated fuel oil, waste liquids and by-products from chemical processes containing oxygenated hydrocarbonaceous organic materials, and mixtures thereof.

The term "liquid hydrocarbon" as used to define gasifier fuels is intended to include various materials, such as crude oil, petroleum distillates and residues, asphalt, gas oil, residual oil, tar-sand oil and shale oil, coal derived oil, aromatic hydrocarbons, coal tar, cycle gas oil from fluid-catalytic-cracking operations, furlural extract of coker gas oil, and mixtures thereof. The term "gaseous hydrocarbons," as used herein to define gasifier fuels includes methane, ethane, coke-oven gas, refinery gas, acetylene tail gas, ethylene off-gas, and mixtures thereof. The term "solid hydrocarbon fuels," as used herein to describe suitable solid gasifier feedstocks, includes coal, lignite, coke, residue derived from coal liquefaction, peat, oil shale, tar sands, pitch, particulate carbon (soot or ash), solid carbon-containing waste materials, such as sewage, and mixtures thereof.

It is often advantageous to mix feeds. One particularly important hydrocarbonaceous material is asphaltenes separated by solvent extraction from a heavy crude or other asphaltene-containing liquid hydrocarbon. A second particularly important hydrocarbonaceous material is petroleum coke. Both are byproducts of refinement or upgrading of hydrocarbons, and are therefore often present for integrated processes involving gasification and liquid hydrocarbon upgrading.

The hydrocarbonaceous fuels are reacted with a reactive oxygen-containing gas, preferably substantially pure oxygen having greater than about 90 mole percent oxygen, or, less preferably, oxygen enriched air having greater than about 22 mole percent oxygen. Substantially pure oxygen is preferred, especially if hydrogen will be separated for use in hydrotreating. Even more preferably, the gasification process utilizes substantially pure oxygen containing above about 95 mole percent oxygen.

Substantially pure oxygen, and byproduct nitrogen, is typically obtained by air separation plants. The process of separating air into oxygen-enriched air or substantially pure oxygen and nitrogen is known in the art, and such plants are commercially available from a number of sources. The substantially pure oxygen, e.g. typically greater than 95 mole % oxygen, which is fed to the partial oxidation gas generator for the production of fuel, gas, is produced in a conventional air separation unit. For a description of a typical air separation unit, reference is made to *Kirk-Othmer Encyclopedia of Chemical Technology*, Third Edition Volume 7 John Wiley & Sons, pages 229 to 231.

In the gasification reactor, the hydrocarbonaceous fuel is contacted with the oxygen-containing gas. The partial oxidation of the hydrocarbonaceous material is completed, optionally in the presence of a temperature control moderator such as steam, in a gasification zone to obtain the hot partial oxidation synthesis gas. The mole ratio of hydrogen to carbon monoxide may, but need not necessarily, be about one to one. There is often some inerts in the synthesis gas, particularly nitrogen and carbon dioxide. There are often contaminants, such as hydrogen sulfide and COS.

In the reaction zone, the contents will commonly reach temperatures in the range of about 1,700° to 3,000° F., and more typically in the range of about 2,000° to 2,8000° F. Pressure will typically be in the range of about 1 to about 250 atmospheres, and more typically in the range of about 15 to about 150 atmospheres, and even more typically in the range of about 60 to about 80 atmospheres.

The high pressure synthesis gas is cooled, and many of the contaminants are removed, preferably with energy recovery such as by steam generation and/or steam superheating. Typical convection and radiant coolers are shown and described in U.S. Pat. Nos. 3,998,609; 4,328,006; 4,377,132; and 4,462,339, the disclosures of which are incorporated by reference. Alternatively, the hot raw fuel gas leaving the reaction zone of the gas generator may be cooled by being quenched in water contained in a quench tank. For example, a quench tank which is ordinarily located below the gas generator along the central longitudinal axis is shown and described in U.S. Pat. No. 4,801,307, the disclosure of which is incorporated by reference. The partially cooled stream of fuel gas leaving the gas cooler is passed into a gas cleaning zone where particulate carbon and any other entrained solids may be removed therefrom. The cooling usually utilizes lower grade heat recoveries to obtain maximum value of the heat. There may be conventional steps of steam removal and, where appropriate, of composition adjustment.

If hydrogen gas is a desired product, it is often advantageous to subject the synthesis gas to a process known as steam reforming or water shifting to increase the relative yield of hydrogen gas. Steam reforming is a process of adding water, or using water contained in the gas, and reacting the resulting gas mixture adiabatically over a steam reforming catalyst. The reaction is as shown below:

$$H_2O+CO=>H_2+CO_2$$

The water shift process, or steam reforming, converts water and carbon monoxide to hydrogen and carbon dioxide. Steam reforming, including such variations as a sour shift, are known to the art. A shift process is described in, for example, U.S. Pat. No. 5,472,986, the disclosure of which is incorporated herein by reference.

The gas temperature typically is in the range 750° to 1050° C. The shift reaction is typically exothermic, and heat recovery by, for example, steam generation, reactant/product heat exchange, and other heat exchanges, is usually included.

The synthesis gas composition is typically hydrogen gas at 25 to 45 mole percent, carbon monoxide gas at 40 to 50 mole percent, carbon dioxide gas at 10 to 35 mole percent, and trace contaminants. In a steam reformed synthesis gas a typical composition is hydrogen gas at 35 to 65 mole percent, carbon monoxide gag at 0.2 to 10 mole percent, carbon dioxide gas at 30 to 60 mole percent, and trace contaminants. These ranges are not absolute, but rather change with the fuel gasified as well as with gasification parameters.

Contaminants in the gas, especially sulfur compounds and acid gases, can be readily removed. The synthesis gas contains hydrogen sulfide and COS formed from sulfur in the feed to the gasifier. The COS is shifted in the steam reformer following the same reaction path as carbon monoxide to form hydrogen sulfide and carbon dioxide.

The hydrogen sulfide, an acid gas, is easily removed from the synthesis gas. Convention amine solvents, such as MDEA, can be used to remove the hydrogen sulfide. Physical solvents such as SELEXOL and RECTIXOL can also be used. The physical solvents are typically used because they operate better at high pressure. The synthesis gas is contacted with the solvent in an acid gas removal contactor. Said contactor maybe of any type known to the art, including trays or a packed column. Operation of such a acid removal contactor is known in the art.

Hydrogen gas is often used in refining processes, particularly hydrotreating. For many applications, especially for hydrotreating hydrocarbons, the hydrogen is required at higher purity than is available in synthesis gas or even water shifted synthesis gas, and at pressures between about 1000 psi and about 3000 psi.

A high pressure hydrogen rich gas stream can be obtained from synthesis gas utilizing a separation technology, preferably a membrane. Membranes are a cost effective alternative to, for example, a pressure swing absorption unit. The membranes typically reduce the pressure of the product hydrogen so it has to be compressed prior to use. However, the pressure of the non-permeate is sufficiently high to allow use in a combustion turbine without further compression, and typically this gas must be expanded to lower the pressure to that needed for the combustion turbine.

In contrast, the off gas from a pressure-swing absorption unit is provided at nearly atmospheric pressure, and subsequent utilization for any application other than boiler fuel requires compression. Use of this low heating value gas for boiler fuel is not preferred for economic reasons, and compression is also not preferred for economic reasons.

The synthesis gas can be contacted with a membrane, said membrane of a material and construction that allows small molecules like hydrogen to preferentially pass through (permeate) while the larger molecules (such as carbon monoxide and carbon dioxide, collectively) preferentially do not permeate. The membrane can be of any type which is preferential for permeation of hydrogen gas over carbon dioxide and carbon monoxide. Many types of membrane materials are known in the art which are highly preferential for diffusion of hydrogen compared to nitrogen. Such membrane materials include those composed of silicon rubber, butyl rubber, polycarbonate, poly(phenylene oxide), nylon 6,6, polystyrenes, polysulfones, polyamides, polyimides; polyethers, polyarylene oxides, polyurethanes, polyesters, and the like. The membrane units may be of any conventional construction, and a hollow fiber type construction is preferred.

The synthesis gas is passed along a membrane at high pressure, typically between about 500 and about 2000 psi, more typically between about 800 psi and about 1200 psi. A hydrogen-rich gas permeates through the membrane. The permeate experiences a substantial pressure drop of between about 300 to 700 psi as it passes through the membrane. The permeate is typically in the range of between about 200 psi and 1500 psi, more typically between about 400 psi and 700 psi.

The non-permeate gas is advantageously burned in a combustion turbine, thereby generating power. The non-permeate pressure must be reduced to a moderate pressure, usually between about 100 and about 500 psi, more typically between about 200 and about 400 psi, for use in a combustion turbine. The non-permeate gas is advantageously expanded in a manner to provide energy which is used to compress the permeate gas.

The invention will be explained in terms of hydrotreating. Those skilled in the art will note that the process is also amenable to hydroprocessing, hydrodesulfnrization, hydrocracking, catalytic reforming, and other related processes where hydrogen is reacted with hydrocarbons in a manner such that small quantities of volatile hydrocarbons and/or hydrogen exist in a liquid hydrocarbon. Indeed, the process of the current invention is amenable in any process where a small quantity of volatile hydrocarbons or hydrogen is found in a liquid hydrocarbon stream, provided there is high pressure stripper gas available and provided there is a combustion turbine in operation. Small quantities of volatiles typically means less than about 10 weight percent, more typically less than about 5 weight percent, and often less than about 3 weight percent, of the liquid hydrocarbon.

In one embodiment of the invention, a crude is deasphalted, and the separated asphaltenes are gasified. The synthesis gas provides the hydrogen for hydrotreating the deasphalted crude. Of course, the process of the current invention is amenable to crude, to fractions of a crude, or to the hydrocarbon products of various processing streams.

Hydrotreating of liquid hydrocarbons is most effective with relatively pure hydrogen. The hydrogen-rich permeate gas from a membrane may be advantageously subjected to steam reforming and carbon dioxide removal to further increase the purity of the hydrogen gas.

The process of steam reforming has been previously described. Steam reforming will reduce the carbon monoxide content of the permeate gas from the membrane, while increasing the hydrogen and carbon dioxide concentration of the permeate. If the permeate has been steam reformed, most of the remaining carbon will be in the form of carbon dioxide. This carbon dioxide in the hydrogen-rich permeate is advantageously be reduced utilizing a carbon dioxide absorber.

The carbon dioxide absorber is a gas-liquid contactor that removes carbon dioxide by contacting the gas with a solvent. As used with respect to the carbon dioxide absorber, the term "solvent" is any liquid that preferentially removes carbon dioxide, as opposed to hydrogen, from a gas stream comprising both carbon dioxide and hydrogen. The carbon dioxide absorber advantageously removes carbon dioxide by contacting the gas with an amine or a physical solvent.

In the carbon dioxide removal step, the so-called "chemical" solvents can be used, such as ethanolamines or potassium carbonate, especially in the established processes such as "AMINE GUARD", "BENFIELD", "BENFIELD-DEA", "VETROCOKE" and "CATACARB". As examples of physical solvents there may be mentioned: tetramethylene sulfone ("SULFfNOL"); propylene carbonate (FLUOR); N-methyl-2-pyrrolidone ("PURISOL"); polyethyleneglycol dimethyl ether ("SELEXOL"); methanol ("RECTISOL"), and water. Water can be used, especially if there is pH control of the water. One method is a carbonate-based water system wherein carbonates such as potassium carbonate in the water lowers the pH. This low pH water absorbs carbon dioxide to form bicarbonate salts. Later, heating this water liberates carbon dioxide and regenerates the potassium carbonate.

The acid gas removal gas-liquid contactor typically operates at below about 100° C., preferably below about 70° C., more preferably below about 40° C. The permeate and the solvent are cooled as needed, preferably utilizing the heat via a heat exchanger with another fluid. Relatively cool, moderate to high pressure, high purity hydrogen is thereby provided to a hydrotreater, as shown in line (26) in FIG. 1.

Hydrotreating is a process that reacts hydrogen with a petroleum feedstock, thereby removing objectionable elements such as sulfur and bound nitrogen, and reduces the aromicity of the feedstock by converting aromatics to paraffins. Most hydrotreating processes operate at below 800 degrees F., contacting hydrogen and the feedstock in the presence of a catalyst, often cobalt and molybdenum oxides on alumina, but also occasionally including nickel-cobalt-molybdenum compounds.

In hydrotreating operations, hydrogen is contacted with hydrocarbons in the presence of a catalyst at conditions of high pressure and temperature. Hydrocarbon liquid is generally preheated prior to entering a hydrotreater. In FIG. 1, hydrocarbon liquid is introduced via line (68), and is preheated in heat exchanger (66) using heat from the hydrocarbon liquids and gas stream exiting the hydrotreater (10). The incoming hydrocarbon liquid is then conveyed via line (32) to the hydrotreater (10), and hydrogen is conveyed to the hydrotreater (10) through line (11).

The hydrogen partial pressure must be kept high to keep the hydrogenation reaction rate at acceptable levels. The catalyst facilitates the breaking of carbon-carbon, carbon-sulfur, carbon-nitrogen, and carbon-oxygen bonds, and the subsequent bonding with hydrogen. The purpose of this operation is to increase the value of the liquid hydrocarbon stream by removing sulfur, reducing acidity and aromicity, and creating shorter hydrocarbon molecules.

The catalysts are used to promote certain forms of hydrotreating or reforming. The catalyst may be in the form of pellets, tablets, extrudates, spheres or beads, however, to maintain reproducible diffusivity within the formed catalyst and reproducible pressure drop through the catalyst bed it is desirable to control the diameter of the formed catalyst within narrow limits. Generally, it is preferred that the catalyst be separated from the hydrocarbon liquid, or the temperature be reduced, or both, to prevent unwanted reactions between the stripper gas and the hydrocarbon liquid.

The pressure, temperature, flow rates, and catalysts that are required to complete the hydrogenation reactions are known to the art. Typical conditions of the thermal hydrocracking are as follows: the reaction temperature of about 300° to about 480° C.; the partial pressure of hydrogen of about 30 to about 200 kg per square centimeter; the liquid space velocity of about 0.1 to 2.0 per hour. Catalysts may be advantageously added, often at about 0.01 to 0.30 weight per weight of fluid.

Hydrotreating is most effective when the hydrocarbon mixture is contacted with relatively pure hydrogen. Hydrotreating requires a hydrogen-rich gas comprising greater than about 80 mole percent, of hydrogen gas. The hydrotreating creates volatile hydrocarbons, volatile sulfur- and nitrogen-containing hydrocarbons, hydrogen sulfide, and other gaseous contaminants. Nevertheless, the gas fraction is separated in flash drum (14) down stream of the hydrotreater (10). The gas fraction is removed via line (16) in FIG. 1, and is predominantly hydrogen. This gas is advantageously recycled to the hydrotreater, often after treatment to remove condensable hydrocarbons and/or acid gases. This gas stream is separated from the hydrocarbon liquid in flash drum (14), cooled in heat exchanger (18), and then transferred via line (20) to a unit (22) wherein condensables and optionally acid gases are, removed. These liquid hydrocarbons are removed via line (80) in FIG. 1. Acid gasses are absorbed in a solvent, and the acid rich solvent removed in line (81) to a unit (not shown) where the acid gas solvents, also called wash solvents, are regenerated. Of course, as described below, the removal of acid gases and condensed liquids can be done in separate units. Acid gas solvent is recycled to unit (22) via line (82). Most of the hydrogen-rich gas exits the treater (22) via line (24) to a compressor (28), and from the compressor via line (30) back to the hydrotreater. The gas may be reheated prior to being recycled to the hydrotreating reactor.

In typical hydrotreating processes, a portion of the sulfur components are removed from a hydrocarbon feed stream by reaction of the sulfur components with hydrogen gas in the presence of a suitable catalyst to form hydrogen sulfide (acid gas). Hydrogen sulfide will therefore be present in the stripper gas after the gas has contacted and removed volatiles from the hydrotreated product. Hydrogen sulfide can be removed from the recycled hydrogen gas stream by using a wash solvent (such as amine), beneficially followed by conversion of the hydrogen sulfide to elemental sulfur in a Claus plant.

The hydrotreater effluent is separated into a gas phase and a liquid phase, often at a pressure between about 50% to about 100% times the hydrotreater pressure, more typically between about 80% to 100% of the hydrotreater pressure. Separation can take place in a flash drum or at the top of the hydrotreater vessel itself.

The hydrotreater effluent is advantageously cooled prior to separating the gas phase from the liquid phase, for example in heat exchanger (66) in FIG. 1. This keeps a larger fraction of the natural gas liquids, that is, semi-volatile hydrocarbons such as alkanes between propane and octane, as well as benzene, toluene, xylene, and the like, in the liquid. The effluent from the hydrotreater is used to preheat the feed stream in heat exchanger (66), thus cooling the effluent. Hydrotreating is an exothermic reaction, but the reactants must be preheated to initiate the reaction. The liquid hydrocarbon, for example a deasphalted oil, is routed from the deasphalter to a charge drum. The deasphalted oil and the hydrogen are mixed. The FIG. 1 does not show the charge drum, showing instead the simplified process where the gas is contacted with the liquid in the hydrotreater itself. The mixture is advantageously heated in a Feed/Product Heat Exchanger (66). This heat exchanger utilizes heat from the hydrotreated product to heat the feed entering the hydrotreater, and cools the hydrotreater effluent. The hydrotreater stream may also be heated using a fired heater to reach the temperature required for the reaction to be initiated, i.e., between about 600 F. and about 1200 F.

The hydrotreater effluent may be further cooled in other heat exchangers, advantageously utilizing this heat energy. The liquid hydrocarbon stream is then separated from the hydrogen rich gas in the flash drum, and most of the gas is treated, heated and recycled.

A small purge stream may be withdrawn via line (46) to limit the buildup of volatile hydrocarbons. This purge stream is advantageously mixed with the gas being burned in the combustion turbine (58). It may be advantageous to strip hydrogen sulfide from the stripper gas before combusting this gas, to minimize the sulfur oxides in the exhaust. It may also be advantageous to add this purge gas stream to the high pressure synthesis gas, so that the work provided by expanding this gas to combustion turbine pressure can be economically recovered.

Hydrotreating typically takes place at pressures of between about 800 psi and about 3000 psi, and at least a fraction of the volatile hydrocarbons and hydrogen are dissolved in the hydrocarbon liquid after separation of the hydrogen gas and the hydrotreated liquid.

The next step is to reduce the pressure on the hydrotreated liquid. The cooled liquid is conveyed to a stripper (38) via line (70). The gas that flashes off the hydrotreater liquid when the pressure is reduced to the stripper pressure may be separately collected in a flash drum (not shown) and treated. Alternatively, this gas may be intermixed with the stripper gas and the volatiles the stripper gas removes from the hydrotreater liquid effluent.

In conventional hydrotreating, the separation of contaminants from hydrotreated liquid hydrocarbons is achieved by using a high pressure steam stripper and a flash drum, or by flashing and distilling the oil from the hydrotreater, the latter often accompanied by steam stripping.

However, when gas is being combusted in a combustion turbine, it is advantageous to strip the hydrogen and volatile hydrocarbons with a gas, thereby providing combustibles at a pressure where they can be added to the combustion turbine without compression. The separation of dissolved hydrogen and volatile hydrocarbons from hydrotreated liquid hydrocarbons is advantageously achieved using a stripper, wherein the gas is at a pressure sufficient to mix with combustion turbine fuel without additional compression. The stripping can be in any conventional gas/liquid stripping vessel (38) where pressurized gas is contacted with the hydrogen/hydrocarbon-containing liquid. Contacting is advantageously countercurrent utilizing a contacting tower such as is known to the art, i.e., a packed tower, a tray tower, or any other contactor.

Figure 2:
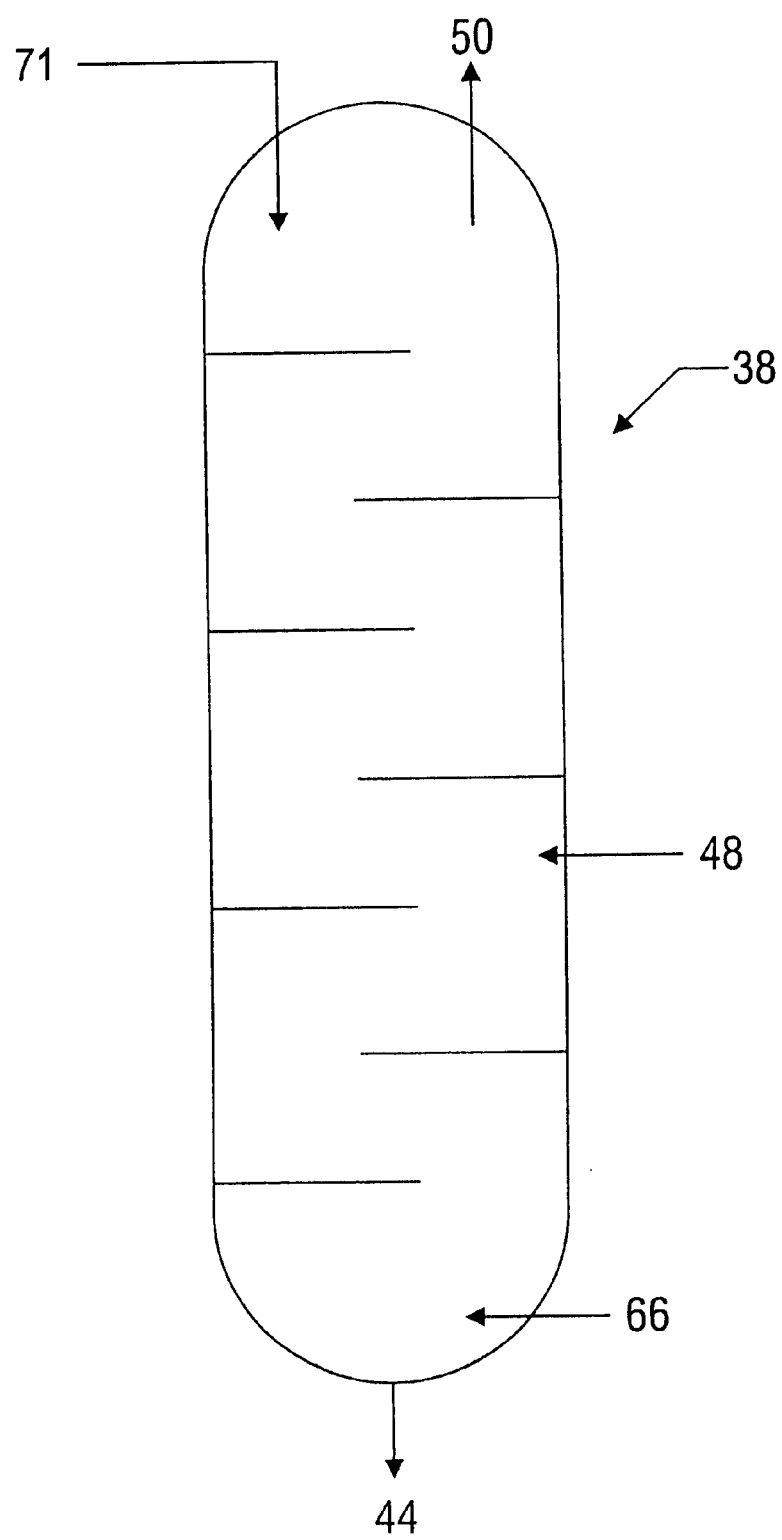
FIG. 2 is a schematic of a stripper column utilizing two separate stripper gases.

The cooled hydrotreater effluent liquid is contacted with the stripper gas, provided by line (48) in FIGS. 1 and 2, at a pressure advantageously near or above the pressure of the combustion turbine.

This gas strips the volatiles, i.e., hydrogen, the volatile hydrocarbons, hydrogen sulfide, and the like, from the oil. The temperature of the liquid and gas is not important. At higher temperatures, more of the hydrocarbons will be vaporizable from the hydrocarbon liquid. Generally, heat can be recovered from the liquid after hydrotreating to minimize the loss of light liquids, that is, hydrocarbons that contain between about 4 and about 9 carbon atoms. Heat is also lost due to vaporization of volatile hydrocarbons.

The pressure of the stripping gas in the stripper is not important, provided the hydrogen and hydrocarbon-containing stripper gas can be added to the combustion turbine without additional compression. Generally, the lower the pressure, the less gas needed to strip volatiles from the liquid.

The stripper gas can be any available gas. The stripper gas can be, for example, one or more of hydrogen, synthesis gas, combustion turbine fuel gas, hydrotreater purge gas that has had condensables removed or nitrogen. It may often be advantageous to used mixed gas, such as nitrogen and combustion turbine fuel gas. It may, often be advantageous to use different gases sequentially, for example, stripping with nitrogen followed by stripping with either synthesis gas or hydrogen. An example of this is shown in FIG. 2, wherein nitrogen stripper gas is introduced via line (48) and a second stripper gas is introduced via line (66). Alternatively, as shown in FIG. 1, the hydrocarbon liquid leaves the first stripper via line (40) to a second stripper (42), where it is contacted with a second stripper gas from line (66) before exiting via line (44). This second stripper (42) may be at a lower pressure, so the second stripper gas exiting via line (69) may or may not be routed to the combustion turbine.

Nitrogen is the preferred stripping gas, either alone or in combination with other gases. Nitrogen is advantageously obtained as a byproduct from the air separation plant that provides oxygen-enriched gas to the gasifier. The presence of nitrogen reduces the combustion temperature, thereby reducing the amount of undesired nitrous oxides in the combustion exhaust. The pressurized nitrogen also imparts power to the combustion turbine as it expands.

Nitrogen at about the same or at a lower temperature as the cooled hydrocarbon is used to strip the volatile gases from the hydrotreater outlet liquid. When steam is used in a conventional hydrotreater/hydrocracker, sour water is formed from the condensed steam. Separation and disposal of the sour water is difficult and costly. In the invention, the sour water is not generated.

In a preferred embodiment of the invention, a feed/effluent exchanger from the nitrogen stripper and a cooler, for example an air fan cooler, are used to cool the liquid hydrocarbons entering via line (70) to between 100 F. and 300 F., preferably between about 100 F. and 250 F., within the stripper so that desirable hydrocarbon liquid products including propane and butanes are remain in the liquid.

The volatile hydrocarbons, carbon oxides, plus dissolved hydrogen, are then stripped from the liquid hydrocarbons using nitrogen. It is preferred that the stripping be done in a gas-liquid contactor. Said contactor may be of any type known to the art, including but not limited to trays, i.e., the stripper (38) in FIG. 2, or a packed column. Operation of such a contactor is known in the art. The quantity of nitrogen used will depend on the number of theoretical-plates in the contactor, the hydrocarbon throughput and the pressure and temperature. Operation of such a contactor is, with the benefit of this disclosure, within the ability of one skilled in the art.

The stripping can be at any pressure, including up to the hydrotreater pressure. Stripping is preferably performed at a pressure equal to or greater than, i.e., between about 0 and about 100 psi above the combustion pressure of the combustion turbine, as this results in the lowest compression needed for the stripper gas, results in the lowest amount of stripper gas dissolved in the liquid after stripping, but does not require additional compression. This stripping pressure will typically be between about 200 and about 600 psi, more typically between about 200 and about 500 psi, even more typically between about 200 and about 400 psi.

The amount of stripping gas, i.e., nitrogen, needed to recover the carbon oxides from the solvent will depend among other factors on the pressure, the temperature, and the number of theoretical plates in the gas-liquid contactor. Typically the amount of stripping gas is 0.5 to 10 times the volume of the hydrotreated hydrocarbon liquid at the stripper pressure and temperature, but the range varies widely. The setting of the flow-rates is within the ability of one skilled in the art, given the benefit of this disclosure.

Additional cooling of the vapor in the top of the stripper is advantageously supplied, for example by heat exchange with liquid hydrocarbons condensed from the recycled hydrogen rich stream hydrotreater gas, or from the entering vaporized nitrogen, or from vaporizing liquid nitrogen. Cooling to between about 30 F. to about 100 F. will maximize the recovery of condensables. This allows all the valuable hydrocarbons, that is, propane plus, to be condensed from the stripper gas and captured as liquid product.

Large excesses of nitrogen should be avoided, as the combined syngas and stripped gas may have poor flammability characteristics if too much nitrogen is added. The volume ratio of nitrogen gas to combustion turbine fuel gas, where the fuel gas includes synthesis gas, hydrotreater purge gas, and stripped hydrogen and hydrocarbons in the nitrogen, is preferably in the range of about 0.5 to 2.0, such as in the range of about 0.7 to 1.3, say about 1.

The stripper overhead, which contains nitrogen, hydrogen sulfide, hydrogen, methane, and ethane, is optionally routed via line (50) to an condenser/absorber (52) where it is cooled and condensed liquids are sent via line (54) back to the remaining liquids, or is contacted with an amine or primary acid gas removal solvent to remove the hydrogen sulfide, or both. The stripper is operated at sufficient pressure to allow the sweetened stripper overhead to be fed to a synthesis gas-fired combustion turbine without compression.

The nitrogen-carbon oxides-hydrogen gas stream is advantageously conveyed via line (36) to the combustion turbine (58), where it is mixed with the synthesis gas. The nitrogen-carbon oxides-hydrogen gas stream provides power to the combustion turbine and moderates the temperature within the turbine. The presence of the nitrogen-carbon oxides-hydrocarbon-hydrogen diluent gas in the combustion turbine gas therefore both reduces nitrogen oxides ($NO_x$) emissions in vented exhaust, line (62) and increases power output as represented by line 42 in FIG. 1. Therefore, the efficiency and the emissions of the unit are improved.

The condensables from the stripper overhead (22) consist of hydrogen sulfide and short chain hydrocarbons. The mixture may be sent to the gasifier, or may be treated to remove residual hydrogen sulfide and the light hydrocarbons recovered.

Contacting the gas with warm water as described U.S. Pat. No. 5,251,433, the disclosure of which is incorporated by reference, may advantageously humidify the nitrogen stripper gas. The water vapor further moderates the combustion turbine temperature and reduces $NO_x$ emissions.

The stripper gas may be but is not necessarily further cooled to remove additional condensables such as propane.

The stripper gas may be combined with the combustor fuel or be separately introduced into the combustor of a combustion turbine. A combustion turbine advantageously burns the pressurized non-permeate gas from the membrane or a hydrogen rich syngas. A combustion turbine is a particularly effective method of generating power from pressurized fuel gas. The syngas must have sufficient composition and carburation to support combustion in the combustion turbine. Flue gas containing water humidified nitrogen gas and a substantially reduced amount of $NO_x$ gases is produced and passed through a power-producing expansion turbine as the working fluid. Increased power and efficiency are-thereby obtained without polluting the atmosphere.

In contrast, in conventional hydrotreating and hydrocracking, the light hydrocarbons would be sent to the fuel gas header and consumed in boilers, which is inefficient.

The syngas combustion turbine fuel gas is typically at high pressure. The combustion turbine requires a pressure of from about 100 to about 500 psi, more typically from about 200 to about 400 psi, even more typically from about 300 to about 400 psi, for its feeds. Expansion of the syngas can be used to provide power, and the expanded syngas can be used in heat exchangers where cool temperatures are required, for example to condense volatiles from gas.

The hydrotreated liquid after stripping contains residual nitrogen. While this poses no problems for many processes, the nitrogen can be problematic if, for example, it can be converted to undesired ammonia in subsequent hydroprocessing units.

Most of the nitrogen in the hydrotreated liquid can be removed by exposing the liquid to low, near atmospheric pressure. Alternatively, the nitrogen may be stripped from the liquid at low pressures using a small sidestream of hydrogen or some other inert gas.

The nitrogen may be stripped from the hydrotreated liquid in the same gas-liquid contactor where the volatiles are stripped with nitrogen, by injecting another gas, for example hydrogen, below, that is, downstream from the nitrogen injection nozzle. This will be effective only if there is sufficient contact, at least equivalent to about 3 or 4 theoretical plates, between the hydrogen injector and the nitrogen injector. A small stream of the hydrogen is injected through the solvent and bubbles up, eventually comingling with the nitrogen and providing a more complete removal of volatiles.

The hydrogen injection helps to displace nitrogen that is saturated in the stripped liquid, and it essentially strips the bulk of the nitrogen from the liquid. Advantageously this hydrogen is co-mingled with the stripped gas for use in the combustion turbine. This hydrogen and hydrocarbon-containing gas is beneficially injected in the combustion turbine.

More efficient stripping, with less hydrogen loss, is possible at lower pressures. Or, simply exposing the stripped and hydrotreated liquid to low pressure, ie., near atmospheric pressure or even to a vacuum, may remove a sufficient amount of nitrogen by simple flashing so that no problems arise with the residual nitrogen remaining in the hydrocarbon liquid.

In a preferred embodiment of this invention, the invention comprises using an inert gas, preferably nitrogen, to strip volatiles from a hydrotreated oil, and then adding this stripper gas to fuel gases fed to a combustion turbine in a process that integrates gasification and hydrotreating. A hydrogen-enriched fraction is separated from the synthesis gas. This hydrogen-enriched fraction is used to hydrotreat a hydrocarbon liquid, producing an upgraded liquid fuel but also producing as a byproduct methane, ethane, propane, and the like. The concentration of these hydrocarbons builds up in the hydrogen-enriched fraction, necessitating a purge stream. This purge stream may be added to the remaining hydrogen-depleted synthesis gas, and this gas is advantageously burned in a combustion turbine. Nitrogen, a byproduct of the manufacture of oxygen-enriched air, is advantageously added to the combustion turbine fuel to increase power and to reduce $NO_x$ emissions. The hydrotreated liquid contains a large quantity of dissolved volatile hydrocarbons. Stripping these volatile hydrocarbons at high pressure allows these hydrocarbons to be added to the combustion turbine fuel, resulting in very efficient utilization of this byproduct without the need, for compression. When the integrated gasification facility utilizes a combustion turbine, the hydrotreating or hydrocracking process can be made more economical by using a nitrogen stripper instead of a steam stripper to remove impurities from the hydrocarbon products.

Benefits of the invention are that 1) the pressurized high nitrogen and hydrogen containing fuel gas have higher mass flow and will produce lower $NO_x$ and more power than natural gas or nitrogen free fuel gas; 2) no fuel gas compressor is required to get the offgas from the hydrotreater into the combustion turbine; 3) no sour water from condensed steam is produced in the stripping process; 4) the sour light hydrocarbons are stripped of hydrogen sulfide and fired in the combustion where they can most efficiently be consumed; and 5) the stripping temperature can be lower utilizing with nitrogen instead of steam, thereby allowing a higher recovery of the valuable hydrocarbons (propane plus) while still removing the methane and hydrogen sulfide.

Another preferred embodiment of the invention involves the integration of solvent deasphalting, gasification, and hydrotreating. A deasphalted oil may be separated from a heavy crude through solvent extraction. The bottoms from the extraction, the asphaltenes, are low value hydrocarbonaceous material. Such material may be advantageously gasified to generate hydrogen, power, steam, and synthesis gas for chemical production. The deasphalted oil can easily be broken down into high-value diesel oil in a fluidized catalytic cracking unit. The deasphalted oil generally contains significant quantities of sulfur- and nitrogen-containing compounds. This deasphalted oil may also contain long chain hydrocarbons. To meet environmental regulations and product specifications, as well as to extend the life of the catalyst, the fluidized catalytic cracking unit feed is hydrotreated first to remove sulfur components. Hydrotreating advantageously utilizes hydrogen that is generated by the gasification unit. The process of the invention then continues with stripping the hydrotreated liquid as described above.

What is claimed is:

1. A process of generating electrical power comprising:
   a) providing a hydrocarbon liquid to a stripper at a pressure between about 100 psi and about 3000 psi, said hydrocarbon liquid comprising dissolved volatile hydrocarbons and dissolved hydrogen gas,
   b) contacting the hydrocarbon liquid with a stripper gas, thereby transferring at least a portion of the volatile hydrocarbons and hydrogen to the stripper gas;
   c) separating the stripper gas from the hydrocarbon liquid;
   d) conveying said stripper gas and a fuel gas to a combustion turbine,
   e) combusting said fuel gas and the said stripper gas at a pressure of between about 100 psi and about 500 psi, thereby producing an exhaust gas;
   f) expanding the exhaust gas though a combustion turbine expander which is connected to a generator, thereby generating electrical power.

2. The process of claim 1 wherein the hydrocarbon liquid is effluent from a hydroprocessing, hydrodesulfurization, hydrocracking, catalytic reforming, and other processes where hydrogen is reacted with hydrocarbons in a manner such that small quantities of volatile hydrocarbons and hydrogen exist in a liquid hydrocarbon.

3. The process of claim 1 wherein the hydrocarbon liquid is effluent from a hydrotreater.

4. The process of claim 1 wherein the fuel gas comprises synthesis gas.

5. The process of claim 1 wherein the stripper gas comprises hydrogen gas, synthesis gas, combustion turbine fuel gas, hydrotreater purge gas that has had condensables removed, nitrogen, or mixtures thereof.

6. The process of claim 1 wherein the stripper gas comprises nitrogen.

7. The process of claim 1 wherein the stripper gas contacts the hydrocarbon liquid at a pressure between about 0 and about 100 psi above the combustion pressure of the combustion turbine.

8. The process of claim 1 wherein the stripper gas contacts the hydrocarbon liquid at a pressure between about 200 and about 600 psi.

9. The process of claim 1 wherein the stripper gas contacts the hydrocarbon liquid at a pressure between about 200 and about 500 psi.

10. The process of claim 1 wherein the stripper gas contacts the hydrocarbon liquid at a pressure between about 200 and about 400 psi.

11. The process of claim 1 wherein the stripper gas contacts the hydrocarbon liquid at a temperature between about 100 F. and about 300 F.

12. The process of claim 1 wherein the stripper gas contacts the hydrocarbon liquid at a temperature between about 100 F. and about 250 F.

13. The process of claim 1 wherein the volume of stripper gas is 0.5 to 10 times the volume of the hydrocarbon liquid at the stripping pressure and temperature.

14. The process of claim 1 further comprising cooling the stripper gas to between about 30 F. to about 100 F., and separating condensables that condense into a liquid phase.

15. The process of claim 1 further comprising contacting the hydrocarbon liquid with a second stripper gas after separating the hydrocarbon liquid from the first stripper gas.

16. The process of claim 15 wherein the first stripper gas is nitrogen and wherein the second stripper gas is synthesis gas or hydrogen.

17. The process of claim 15 further comprising conveying the second stripper gas to the combustion turbine.

18. The process of claim 1 wherein the stripper gas comprises hydrogen sulfide, further comprising removing hydrogen sulfide from the stripper gas prior to conveying the volatile hydrocarbons and hydrogen containing stripper gas to the combustion turbine.

19. The process of claim 1 wherein the stripper gas may be humidified prior to conveying the stipper gas to the combustion turbine.

20. A process for generating power from a synthesis gas and for hydrotreating hydrocarbon liquids, said process comprising:
   a) separating a synthesis gas into a hydrogen-rich gas and hydrogen-depleted gas;
   b) providing a hydrocarbon liquid to a hydrotreater;
   c) conveying said hydrogen-rich gas to said hydrotreater;
   d) contacting said hydrogen-rich gas with said hydrocarbon liquid under conditions wherein the hydrocarbon liquid is hydrotreated, said conditions causing volatile hydrocarbons to form, and said conditions causing a fraction of said volatile hydrocarbons and hydrogen-rich gas to dissolve in said hydrotreated liquid;
   e) separating the hydrogen-rich gas from the hydrotreated liquid;
   f) contacting the hydrotreated liquid with nitrogen, thereby stripping said dissolved hydrogen and volatile hydrocarbons from said hydrotreated liquid, and thereby creating a stripper gas comprising nitrogen, hydrogen, and volatile hydrocarbons;
   g) providing the hydrogen-depleted gas and the stripper gas to a combustion turbine, wherein combustibles are burned to form an exhaust gas; and
   h) expanding the exhaust gas though the turbine which turns a generator, thereby generating power.

21. The process of claim 20 wherein the pressure of the hydrogen-depleted gas at the combustion turbine is between about 100 and about 500 psi, and wherein the hydrotreated liquid is contacted with the nitrogen at a pressure between about 0 and about 100 psi above the pressure of the hydrogen-depleted gas.

22. The process of claim 21 wherein said synthesis gas is provided by a gasifier, said gasifier reacting a hydrocarbonaceous fuel and substantially pure oxygen.

23. The process of claim 22 wherein said hydrocarbonaceous fuel comprises coke.

* * * * *